US011691551B2

(12) United States Patent
Yoshida et al.

(10) Patent No.: US 11,691,551 B2
(45) Date of Patent: Jul. 4, 2023

(54) SEAT FOR VEHICLE

(71) Applicants: TACHI-S CO., LTD., Akishima (JP); Mie University, Tsu (JP)

(72) Inventors: Masami Yoshida, Akishima (JP); Takumi Yamakawa, Akishima (JP); Soichiro Hayakawa, Tsu (JP); Ryojun Ikeura, Tsu (JP)

(73) Assignees: TACHI-S CO., LTD., Akishima (JP); MIE UNIVERSITY, Tsu (JP)

( * ) Notice: Subject to any disclaimer, the term of this patent is extended or adjusted under 35 U.S.C. 154(b) by 0 days.

(21) Appl. No.: 17/449,805

(22) Filed: Oct. 2, 2021

(65) Prior Publication Data
US 2022/0227274 A1 Jul. 21, 2022

(30) Foreign Application Priority Data

Jan. 18, 2021 (JP) .................................. 2021-006034

(51) Int. Cl.
*B60N 2/66* (2006.01)
*B60N 2/02* (2006.01)
*B60N 2/90* (2018.01)

(52) U.S. Cl.
CPC ........... *B60N 2/666* (2015.04); *B60N 2/0232* (2013.01); *B60N 2/99* (2018.02)

(58) Field of Classification Search
CPC ......... B60N 2/666; B60N 2/99; B60N 2/0232
(Continued)

(56) References Cited

U.S. PATENT DOCUMENTS

| 10,583,758 | B2 * | 3/2020 | Ohno ..................... B60N 2/914 |
| 2014/0217792 | A1 * | 8/2014 | Meyer ................. B60N 2/0244 |
| | | | 297/354.1 |
| 2022/0144139 | A1 * | 5/2022 | Meyer ................. B60N 2/0244 |

FOREIGN PATENT DOCUMENTS

| JP | 2003-038599 A | 2/2003 |
| JP | 2004167070 | * 6/2004 |

(Continued)

*Primary Examiner* — Mark R Wendell
(74) *Attorney, Agent, or Firm* — Potomac Law Group, PLLC

(57) ABSTRACT

To provide a technique that enables the reduction of fatigue of a vehicle occupant at low cost and without an increase in the number of parts. Without preparing a sensor in addition to a posture changing mechanism, the position of a lumbar vertebra or thoracic vertebra of each vehicle occupant is estimated by controlling the operation of the posture changing mechanism. The posture changing mechanism includes: a back side support mechanism; a first motor capable of shifting a position of the back side support mechanism with respect to a vertical direction; and a second motor capable of shifting the position of the back side support member with respect to a front-back direction. A position of a lumbar vertebra of the vehicle occupant is estimated by: while changing the vertical position of the back side support mechanism by means of the first motor, changing a forward position of the back side support mechanism at each of the different vertical positions thereof by means of the second motor so as to obtain a turnover number value of the second motor achieving a desired resistance; and comparing the turnover number values of the second motor achieving the desired resistance. A position of the thoracic vertebra is determined by calculation based on the position of the lumbar vertebra. The position of the posture changing mechanism is set based on the results of estimation of the individual positions. Thus, a fatigue reduction effect is (Continued)

provided on the vehicle occupant by utilizing the posture changing mechanism.

6 Claims, 18 Drawing Sheets

(58) Field of Classification Search
USPC .................................................... 297/284.4
See application file for complete search history.

(56) References Cited

FOREIGN PATENT DOCUMENTS

| | | | |
|---|---|---|---|
| JP | 2006-198307 A | | 8/2006 |
| JP | 2016210405 | * | 12/2016 |

* cited by examiner (NO POSTURE CHANGE)
N STATE (PUSH FORWARD THIRD LUMBAR VERTEBRA AREA OF OCCUPANT)
S-SHAPE POSTURE

OPERATION PATTERN

OPERATION PATTERN: SWITCH N STATE TO S-SHAPE POSTURE
1 CYCLE = 30 MINUTES
N ··· MAINTAIN FOR 15 MINUTES
S-SHAPE POSTURE ··· MAINTAIN FOR 15 MINUTES

SEAT FOR VEHICLE

CLAIM OF PRIORITY

The present application claims priority from Japanese Patent Application JP 2021-006034 filed on Jan. 18, 2021, the content of which is hereby incorporated by reference into this application.

BACKGROUND OF THE INVENTION

The present invention relates to a seat for vehicle and more particularly to a technique effectively applied to a vehicle seat having a massage function.

A proposal concerning a massage device is set forth in Japanese Unexamined Patent Application Publication No. 2003-38599. The massage device is configured to automatically detect a physical frame of a user and to provide massage at a proper area of a user's body. Further, Japanese Unexamined Patent Application Publication No. 2006-198307 discloses a massage seat for vehicle which is configured to change a pressure level of the massage according to the settings made by a seat occupant.

SUMMARY OF THE INVENTION

According to Japanese Unexamined Patent Application Publication No. 2003-38599, a sheet-like pressure sensor (physical frame detection sensor) is mounted on a seat surface in order to automatically detect the physical frame of the user. The physical frame of the user is estimated from a back area load distribution. A massaging position for a roller as a massage driver is decided so that the roller is moved to a proper position for the user. Therefore, the massage device requires the physical frame detection sensor in addition to the roller as the massage driver. This leads to the increase in the number of parts.

According to Japanese Unexamined Patent Application Publication No. 2006-198307, the seat for vehicle is equipped with a massage mechanism such as air unit covering a wide area from a back area to a lumbar area of the seat occupant. Therefore, the vehicle seat is expensive, involving a large number of parts and complicated control.

It is, accordingly, an object of the present invention to provide a technique that enables the reduction of fatigue of the seat occupant at low cost and without an increase in the number of parts.

Other problems and novel features of the present invention will become apparent from the description of the present invention and the accompanying drawings.

The following is a brief description of typical features of the present invention.

Without preparing the sensor in addition to a posture changing mechanism, the position of the lumbar vertebra or the thoracic vertebra of each occupant is estimated by controlling the operation of the posture changing mechanism. The posture changing mechanism is set to a position based the estimation results of relevant positions. Then, the posture changing mechanism is used to provide a fatigue reduction effect on the occupant.

According to the above-described seat for vehicle, the fatigue of the seat occupant can be reduced at low cost and without an increase in the number of parts.

DETAILED DESCRIPTION OF THE PREFERRED EMBODIMENTS

Figure 1:
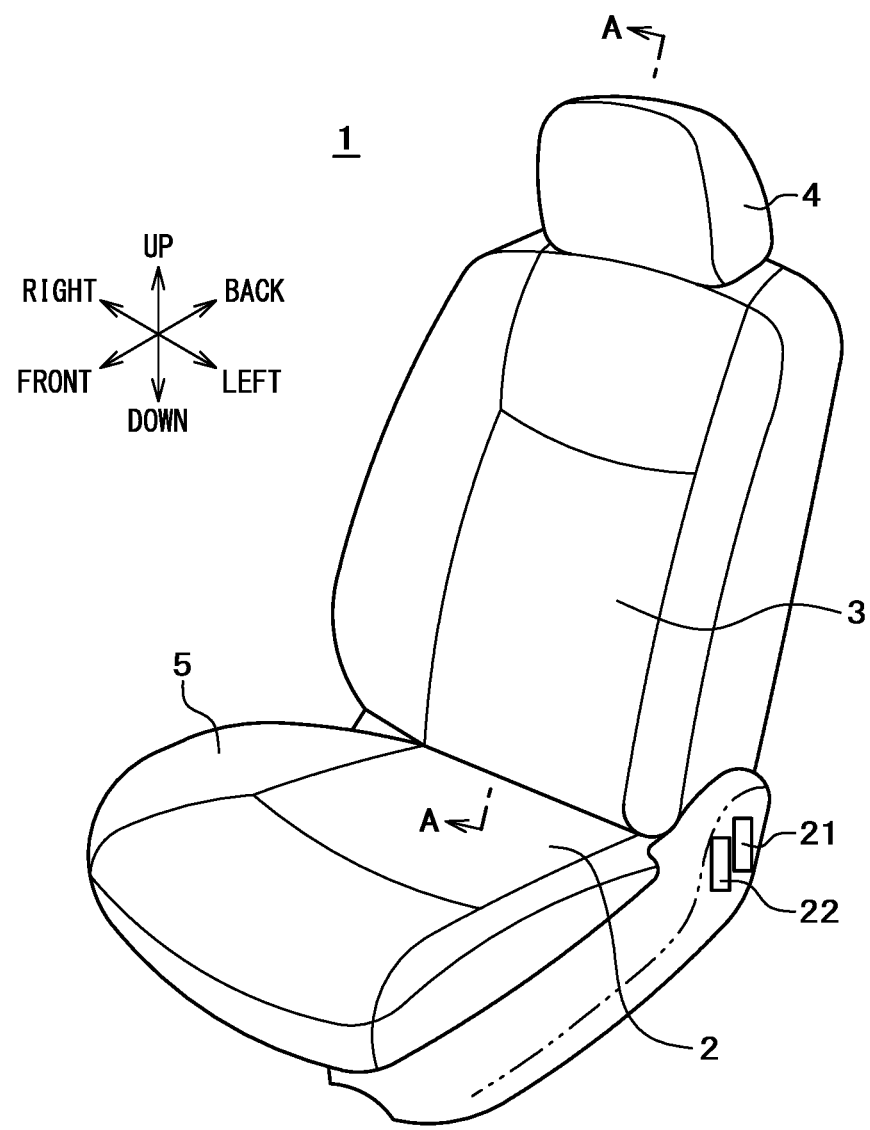
FIG. 1 is a perspective view showing a seat for vehicle according to an embodiment of the present invention.

The embodiments of the present invention will hereinbelow be described with reference to the accompanying drawings.

It is noted that the disclosure is meant only for an example. For greater clarity, there are cases where the drawings provide more schematic illustrations of some parts than those in practical modes in terms of width, thickness, shape, and the like thereof. However, the drawings are not meant to limit the interpretation of the present invention. In the description and the individual drawings, components similar to those described with reference to the foregoing drawing will be referred to by like reference numerals and the detailed description thereof may be dispensed with as needed. In the drawings, an arrow pointing to the front indicates the front side of a vehicle, an arrow pointing to the back indicates the back side of the vehicle, an arrow pointing to the left indicates the left side of the vehicle, an arrow pointing to the right indicates the right side of the vehicle, an arrow pointing upward indicates the upper side of the vehicle, and the arrow pointing downward indicated the lower side of the vehicle. In the following description, the terms "front", "back", "up", "down", "left" and "right" are defined to mean the front, back, up, down, left and right with respect to the vehicle.

Embodiment

FIG. 1 is a perspective view showing a seat for vehicle according to an embodiment of the present invention.

A vehicle seat 1 includes: a seat cushion 2 on which an occupant is seated; a seat back 3 on which the occupant seated on the seat cushion 2 rests his/her back; a head rest 4 supporting a head of the occupant; and side supports 5. The seat back 3 is tiltably connected to the seat cushion 2 by means of a reclining mechanism. A front-back direction adjustment switch 21 is disposed on a side surface of the seat cushion 2 for adjusting a position of a lumbar support portion 60 (described hereinlater) with respect to a front-back direction. Also, a vertical direction adjustment switch 22 is disposed on the side surface of the seat cushion for adjusting the position of the lumbar support portion 60 with respect to a vertical direction.

Figure 2:
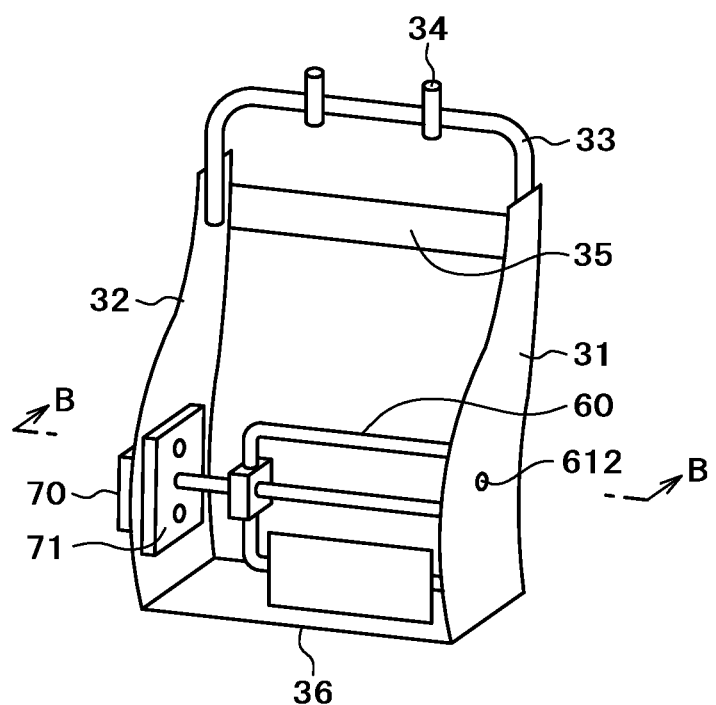
FIG. 2 is a perspective view showing a seat back frame of the vehicle seat according to the embodiment hereof.

FIG. 2 is a perspective view showing a seat back frame which is removed of members on a front side of the seat back 3 (a side in contact with a back of the seated occupant) such as surface skin and urethane pad. A left back side frame is indicated at 31. A right back side frame is indicated at 32. An upper backside frame is indicated at 33. An upper panel is indicated at 35 and a lower panel is indicated at 36. The upper back side frame, the upper panel and the lower panel are connected to the left back side frame 31 and the right back side frame 32, respectively. A support portion for supporting a pair of stays extended from the head rest 4 is indicated at 34. The support portion is fixed to the upper back side frame 33 by welding.

The lumbar support portion is indicated at 60, a lumbar support driving portion is indicated at 70 and a power transmission portion is indicated at 71. An end of a shaft constituting the lumbar support portion 60 is indicated at 612.

Figure 3:
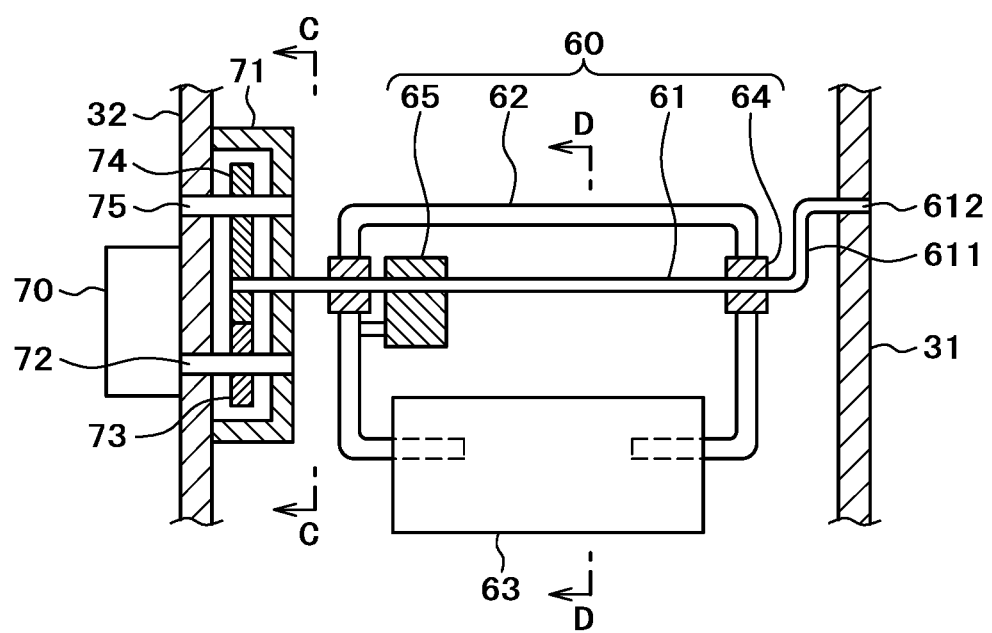
FIG. 3 is a diagram showing an exemplary configuration of a lumbar support portion, a driving portion, and a power transmission portion shown in FIG. 2.

FIG. 3 corresponds to an enlarged view as seen along the line B-B in FIG. 2, showing an exemplary configuration of the lumbar support portion 60, the lumbar support driving portion 70, and the power transmission portion 71. The driving portion 70 includes an electric motor (701 in FIG. 9) equipped with a gearhead and is fixed to the right back side frame 32. An output shaft of the driving portion 70 is indicated at 72. The output shaft has a driving gear 73 secured thereto in the power transmission portion 71.

A sector gear, which is meshed with the driving gear 73 is indicated at 74. The sector gear 74 is supported by the right back side frame 32 and the power transmission portion 71 in a manner to be pivotable about a shaft 75. The driving portion 70 oscillates the sector gear 74 by rotating the driving gear 73 fixed to the output shaft 72 in the forward direction and in the backward direction. An end of a wire A61 constituting the lumbar support portion 60 is fixed to the sector gear 74 at place (decentered portion) away from the shaft 75.

Figure 4:
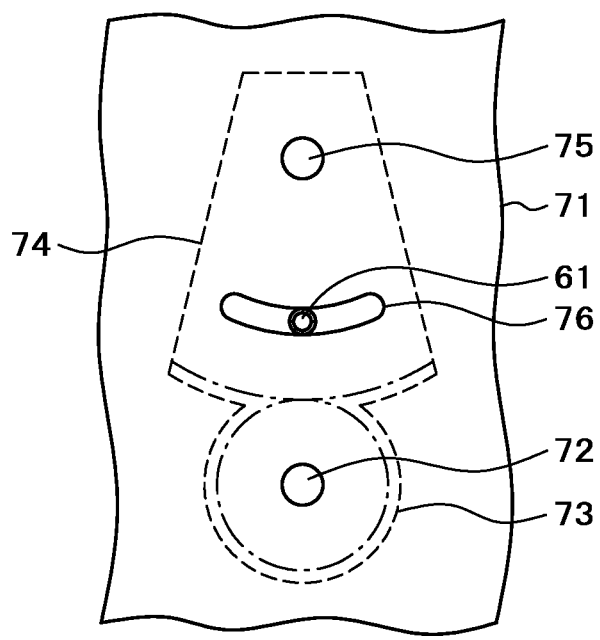
FIG. 4 is a plan view illustrating the power transmission portion.

FIG. 4 corresponds to an enlarged view as seen along line C-C in FIG. 3, illustrating the power transmission portion 71 in plan view. The sector gear 74 and the driving gear 73 are in meshing engagement. The sector gear 73 is configured such that a part of a circular gear is cut away, leaving a portion required for meshing engagement with the driving gear 73. The output shaft 72 of the motor on which the driving gear 73 is mounted and the shaft 75 on which the sector gear 74 is mounted are each pivotally supported by the power transmission portion 71.

The power transmission portion 71 is formed with a groove 76 for guiding the wire A61 eccentrically secured to the sector gear 74. The groove 76 is formed in a shape conforming to a trajectory of the wire A61 oscillating relative to the shaft 75 supporting the sector gear 74.

Returning to FIG. 3, the lumbar support portion 60 includes: the wire 61; a wire 62 supported on the wire 61 by way of two blocks 64 at lateral portions thereof; a resin plate 63 secured to the wire 62; and a vertical driving portion 65 secured to the wire 61 for vertically driving the wire 62. The blocks 64 are fixed to the wire 61 as slidably supporting the wire 62.

A left end of the wire 61 extends through the groove 76 formed in the power transmission portion 71 and is fixed to the sector gear 74. The wire 61 has a right end portion which is once bent at a portion 611 and bent again to define an end portion 612 which is rotatably supported by the left back side frame 31. The end portion 612 is formed such that a center axis thereof is aligned with a center axis of the shaft 75 supporting the sector gear 74.

The lumbar support portion 60 configured in this manner provides for the following operation. The front-back direction adjustment switch 21 disposed on the side of the seat cushion 2 is operated to actuate the driving portion 70 so as to rotate the output shaft 72 a certain degree. Whereby the driving gear 73 fixed to the output shaft 72 oscillates the sector gear 74 about the shaft 75. The oscillation of the sector gear 74 causes the wire 61 having the end thereof fixed to the sector gear 74 to swing about the shaft 75 of the sector gear 74 and along the groove 76 formed in the power transmission portion 71.

In conjunction with the oscillating movement of the wire 61 along the groove 76, the resin plate 63 secured to the wire 62 oscillates about the shaft 75 of the sector gear 74, so that the position of the resin plate 63 is changed with respect to the front-back direction (direction perpendicular to the drawing surface as seen in FIG. 3). Thus, the amount of pressure on the back of the seated occupant via a member (e.g., the urethane pad covered with the surface skin) on the front side (surface on the side in contact with the back of the occupant seated on the vehicle seat 1) of the seat back can be varied. That is, the pressing force can be increased or decreased.

It is noted here that the wire 62 is configured to be guided by the pair of blocks 64 secured to the wire 61 and to be vertically (the vertical direction as seen in FIG. 3) movable relative to the wire 61 as driven by the vertical driving portion 65. A vertical position of the resin plate 63 can be changed by moving up or down the wire 62 relative to the wire 61. Thus, the position to press on the back of the seated occupant via the member (e.g., the urethane pad covered with the surface skin) on the front side (surface on the side in contact with the back of the occupant seated on the vehicle seat 1) of the seat back 3 can be adjusted with respect to the vertical direction (height direction).

Figure 5:
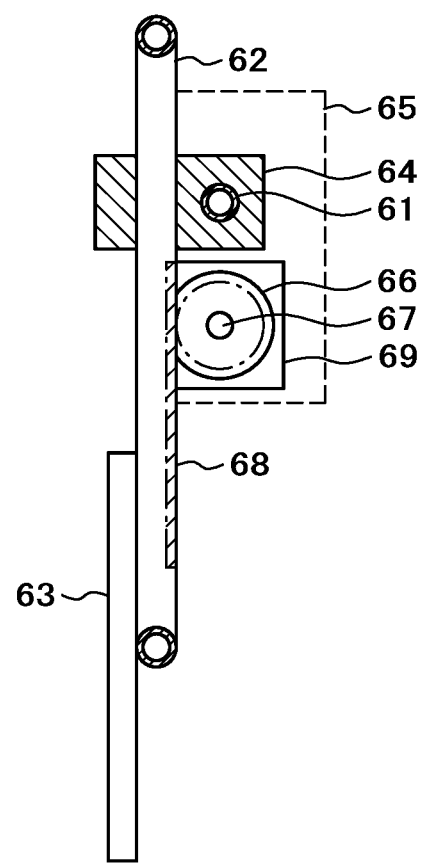
FIG. 5 is a diagram showing a state where a wire 62 is slidably moved downward relative to a wire 61 and retained at place.
Figure 6:
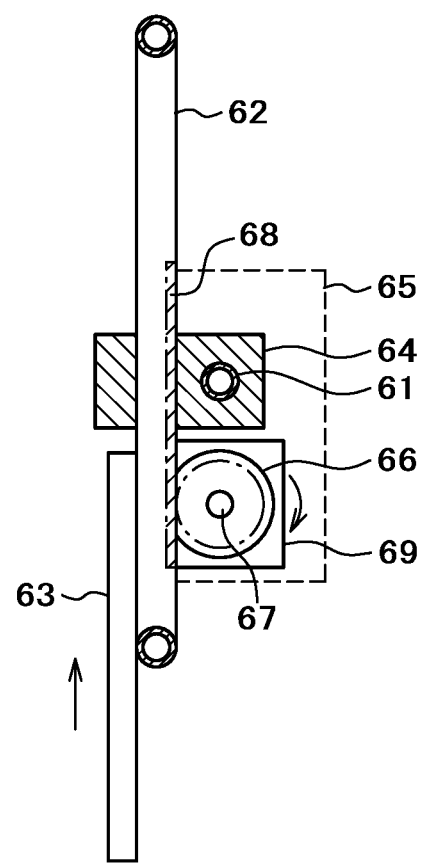
FIG. 6 is a diagram showing a state where the wire 62 is slidably moved upward relative to the wire and retained at place.

FIG. 5 and FIG. 6 each correspond to a sectional view taken on the line A-A of the vehicle seat 1 in FIG. 1. FIG. 5 is a diagram showing a state where the wire 62 is slidably moved down relative to the wire 61 and retained at position. FIG. 6 is a diagram showing a state where the wire 62 is slidably moved up relative to the wire 61 and retained at position. Referring to FIG. 5 and FIG. 6, the wire 62 is retained by the blocks 64 secured to the wire 61 in a manner to be slidably movable in the vertical direction. The wire 61 is mounted with the vertical driving portion 65 for driving the wire 62 with respect to the vertical direction. The vertical driving portion 65 is mounted in position by way of a gear 66 secured to an output shaft 67 of a motor 69 equipped with reducer. On the other hand, the wire 62 is formed with a spur gear 68 meshed with the gear 66. The gear 66 and the spur gear 68 jointly constitute rack and pinion gears.

With the wire 61 and the wire 62 configured in this manner, the following operations are provided. When the vertical direction adjustment switch 22 disposed on the side portion of the seat cushion 2 is operated to actuate the motor 69 with reducer of the vertical driving portion 65 secured to the wire 61, the gear 66 is rotated in the direction of an arrow in FIG. 6. The rotation of the gear causes the wire 62 to move up relative to the wire 61 as guided by the blocks 64 secured to the wire 61. Further, the wire 62 is moved down relative to the wire 61 by rotating the motor with reducer 69 backward so as to change a positional relation between the wire 61 and the wire 62 from that shown in FIG. 6 to that shown in FIG. 5.

Figure 7:
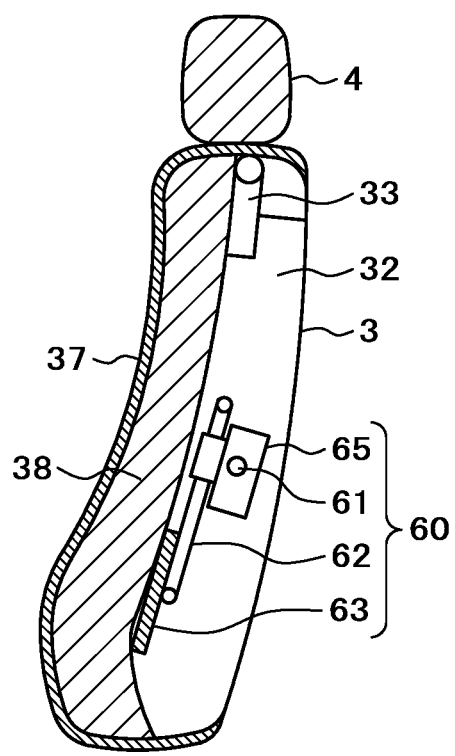
FIG. 7 is a diagram showing a state where a resin plate 63 at a lower position pushes forward a urethane pad 38.
Figure 8:
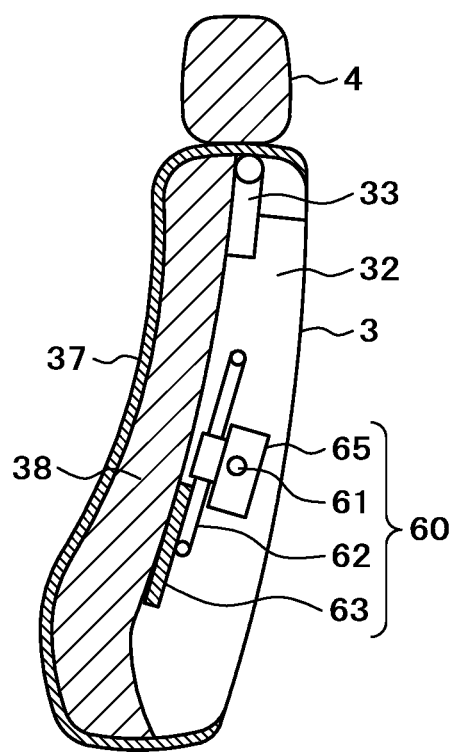
FIG. 8 is a diagram showing a state where the resin plate 63 at an upper position pushes forward the urethane pad 38.

FIG. 7 is a diagram showing a state where the resin plate 63 at a lower position pushes forward the urethane pad 38. FIG. 8 is a diagram showing a state where the resin plate 63 at an upper position pushes forward the urethane pad 38. FIG. 7 shows a pushing state where the resin plate 63 at the lower position protrudes forward to push forward the urethane pad 38. This pushing state corresponds to a state of the lumbar support portion 60 shown in FIG. 5. In this state, the resin plate presses on a lumbar area of the occupant seated on the vehicle seat 1 via the urethane pad 38 and a surface skin 37.

On the other hand, FIG. 8 shows a pushing state where the resin plate 63 protrudes forward to push forward the urethane pad 38 as located at a position higher than the position shown in FIG. 7. In this state, the lumbar support portion 60 corresponds to the state shown in FIG. 6. In this state, the resin plate presses on an area upward from the lumbar area of the occupant seated on the vehicle seat 1 via the urethane pad 38 and the surface skin 37.

These positions of the resin plate 63 with respect to the height direction (vertical direction) and the front-back direction can be independently adjusted by operating the front-back direction adjustment switch 21 and the vertical direction adjustment switch 22.

The present invention provides a fatigue reduction effect on the occupant by means of the vehicle seat 1 described with reference to FIG. 1 to FIG. 8. In the following description, a posture changing mechanism 110 is defined to include, for example, the lumbar support portion 60, the driving portion 70, and the power transmission portion 71. For example, a back side support mechanism (63) corresponds to the resin plate 63. A support changing mechanism (65), for example, corresponds to the vertical driving portion 65 incorporating the motor 69. A pushing amount adjusting motor (701), for example, corresponds to the electric motor incorporated in the driving portion 70.

Figure 9:
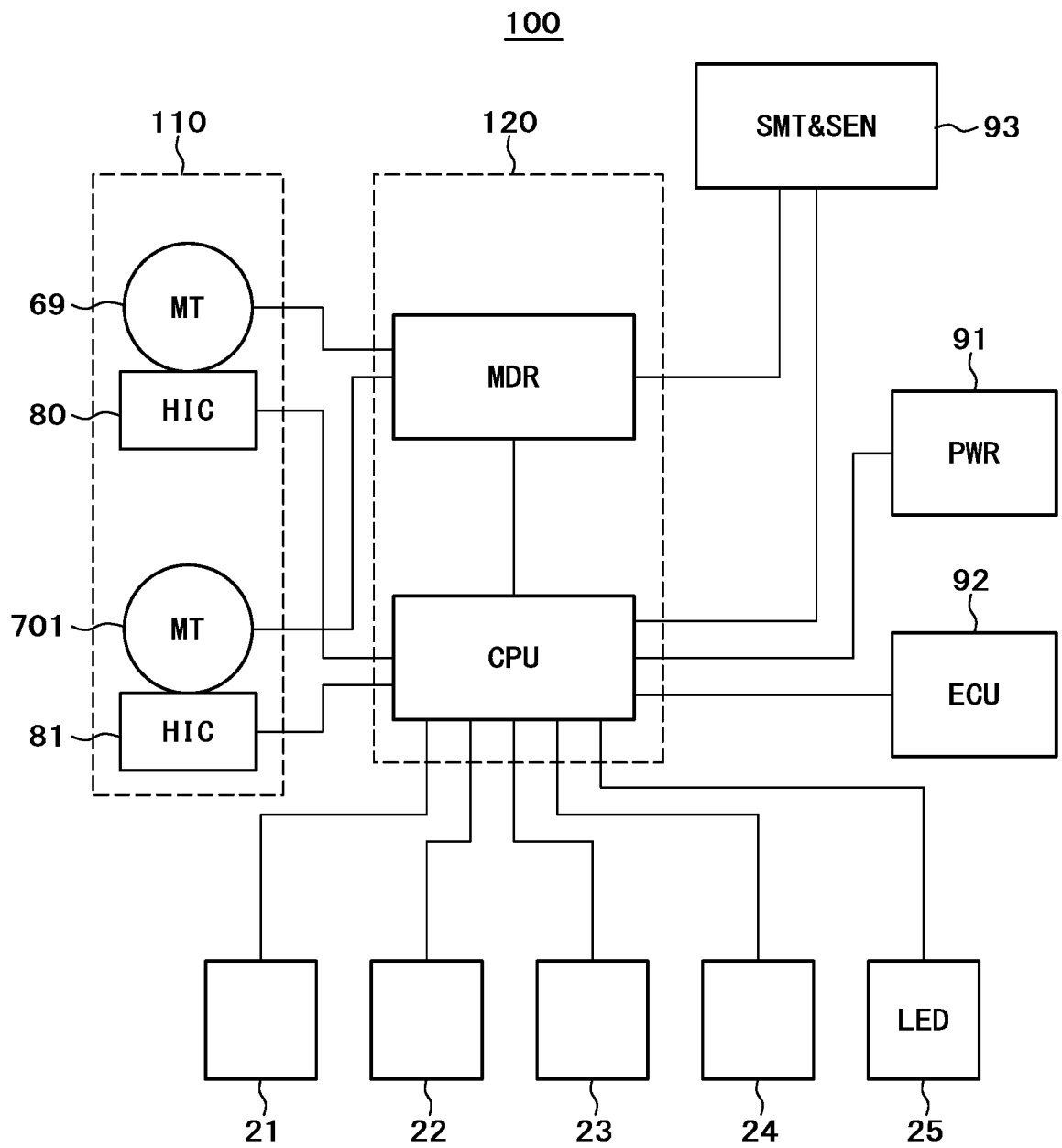
FIG. 9 is a block diagram illustrating an exemplary circuit configuration of a control system according to the embodiment hereof.

FIG. 9 is a block diagram illustrating an exemplary circuit configuration of a control system according to the embodiment. A control system 100 has two functions which include: an estimation system (also referred to as first system) for estimating the position of a thoracic vertebra and a position of a lumbar vertebra of the occupant; and a fatigue reduction system (also referred to as second system) for providing the fatigue reduction effect on the occupant.

The control system 100 is provided at the vehicle seat 1. The control system includes: the posture changing mechanism 110; a control unit 120 for controlling the operations of the posture changing mechanism 110; a plurality of switches 21, 22, 23, 24 connected to the control unit 10; and the like.

The posture changing mechanism 110 includes: a motor (MT) 69 capable of vertically moving the back side support mechanism 63; and the pushing amount adjusting motor 701 capable of moving the back side support mechanism 63 in the front-back direction. The posture changing mechanism 110 further includes: a Hall IC (HIC) 80 as a sensor for detecting a work amount such as turnover number of the motor 69; and a Hall IC (HIC) 81 as a sensor for detecting a work amount such as turnover number of the pushing amount adjusting motor (MT) 701. The motor 69 with reducer may also be referred to as "first motor", and the pushing amount adjusting motor (MT) 701 may also be referred to as "second motor". The Hall IC (HIC) 80 may also be referred to as "first Hall IC", and the Hall IC (HIC) 81 may also be referred to as "second Hall IC".

The control unit 120 is a seat ECU (electronic control unit) and includes: a motor driver MDR for driving the motors 69, 701; and a central processing unit CPU. The motor driver MDR is electrically connected to the motors 69, 701 via a harness. On the basis of control from the central processing unit CPU, the motor driver MDR controls the rotation of the individual motors 69, 701 by way of PWM (pulse width modulation). The central processing unit CPU is a general term for data processors incorporated in the central processing unit. The data processors receive data (values) of the turnover numbers of the motors 69, 701 detected or measured by the HICs 80, 81 and store the data in a memory circuit incorporated in the central processing unit CPU. The central processing unit CPU performs the data processing based on plural data pieces on the turnover numbers stored in the memory circuit. Based on the data processing results, the central processing unit controls the motor driver MDR, for example. The central processing unit CPU is electrically connected with the HICs 80, 81 by means of the harness. The central processing unit CPU is connected to a power source (PWR) 91 such as battery and supplied with an operating voltage from the PWR 91. The central processing unit CPU is also electrically connected to another ECU 92 equipped on the vehicle via the harness, thus configured to perform communications.

Furthermore, the motor driver MDR and the central processing unit CPU are electrically connected to an electric motor of the reclining mechanism, an electric motor of a lift mechanism, an electric motor of a tilt mechanism, an electric motor of a slide mechanism, and a seat motor & sensor 93 including a variety of sensors. Although not shown in FIG. 1, the vehicle seat 1 includes the electric motor of the reclining mechanism, the electric motor of the lift mechanism, the electric motor of the tilt mechanism, the electric motor of the slide mechanism, and the sensors.

The switch 21 is the front-back direction adjustment switch used for manual adjustment of the pushing amount of the motor 701 with respect to the front-back direction. The switch 22 is the vertical direction adjustment switch 22 used for manual adjustment the height of the motor 69 with respect to the vertical direction.

The switch 23 is an operation mode selector switch for determining whether or not to operate the control system 100 as the estimation system and the fatigue reduction system. The switch 23 in ON-state indicates that the control system 100 is operated as the estimation system and the fatigue reduction system. On the other hand, the switch 23 in OFF-state indicates that the occupant uses the switches 21, 22 for manually operating the posture changing mechanism 110.

The switch 24 is a selector switch for switching the operation mode of the fatigue reduction system. As will be described hereinlater, the fatigue reduction system gives choices between an S-shape posture mode (first fatigue reduction mode) where a support position of the back side support mechanism 63 is set to a lumbar vertebra position and a C-shape posture mode (second fatigue reduction mode) where the support position of the back side support mechanism 63 is set to a thoracic vertebra position. The fatigue reduction system is configured for choices between the S-shape posture mode and the C-shape posture mode depending upon whether the switch 24 is in the ON-state (the first mode) or the OFF-state (the second mode).

An LED 25 is made of a plurality of light emitting diodes. The LED 25 is connected to the central processing unit CPU. Based on a signal from the central processing unit CPU, the LED 25 is adapted to indicate the operation mode of the control system 100 by way of combination of ON and OFF states of the light emitting diodes.

Next, the description is made on a case where the control system 100 operates as the estimation system for estimating the position of the thoracic vertebra or the lumbar vertebra of the occupant. The human body includes seven cervical vertebrae, twelve thoracic vertebrae, and five lumbar vertebrae in this order named from the head. Under these, a sacral vertebra and tailbone are contiguous thereto.

In the control system 100, when the switch 23 is turned on, an estimation program related to the estimation system is first activated and executed by the central processing unit CPU. Thus, the positions of thoracic vertebra and lumbar vertebra of the occupant are estimated. After the estimation by the estimation system is completed, the system operation of the control system 100 is switched from the estimation system to the fatigue reduction system. In the fatigue reduction system, the system operation is switched from the estimation system to a fatigue reduction system. In the fatigue reduction system, a fatigue reduction program related to the fatigue reduction system is activated and executed by the central processing unit CPU.

When the estimation system is actuated, a vertical support position of a support changing mechanism 65 is shifted to the lowest stage as an initial state. Accordingly, the back side support mechanism 63 is also set to the lowest stage. The pushing amount adjusting motor 701 is driven from a reference position (also referred to as "N state") at a certain torque for a given period of time (e.g., 3 to 5 seconds) so as to push forward the back side support mechanism 63. In the meantime, a turnover number of the motor 701 is detected by means of the Hall IC 81 and recorded in a built-in memory circuit and the like by the central processing unit CPU.

Next, the vertical support position of the back side support mechanism 63 is shifted upward by the support changing mechanism 65 at a certain space interval (e.g., about 10 to 25 mm). At all of the support positions, the pushing amount adjusting motor 701 is operated under the same conditions as the above while the data (value) on the turnover number of the motor 701 is recorded by the central processing unit CPU.

The data pieces on the turnover number of the motor 701 recorded with respect to all the support positions are compared by the central processing unit CPU. Thus, the central processing unit CPU determines a support position exhibiting the largest turnover number of the motor 701 to be the lumbar vertebra area. A thoracic vertebra area is estimated by substituting the support position exhibiting the largest turnover number of the motor 701 in the following equation 1.

Next, the description is made on the fatigue reduction system.

The fatigue reduction system sets the support position of the back side support mechanism 63 based on the estimation results given by the estimation system. In a case where the S-shape posture mode is designated as an operation mode of the fatigue reduction system by turning on the switch 24, the support position of the back side support mechanism 63 is set to the estimated thoracic vertebra position. In a case where the C-shape posture mode is designated as the operation mode of the fatigue reduction system by turning off the switch 24, the support position of the back side support mechanism 63 is set to the estimated thoracic vertebra position. In the S-shape posture mode and the C-shape posture mode, the system may preferably provide control such that the pushing amount of the back side support mechanism 63 alternate between a pushing amount at the reference position (also referred to as "N state") and the maximum pushing amount at a certain interval (e.g., 5 to 30 minutes).

Estimation System

Next, the description is made on a method of estimating the position of the thoracic vertebra or the lumbar vertebra of the occupant.

Heightwise positions of the thoracic vertebra and the lumbar vertebra of the seated occupant with respect to the vehicle seat 1 vary depending upon the physical frame of the occupant. For effective operation of the fatigue reduction system, therefore, the positions of the thoracic vertebra and the lumbar vertebra of each occupant need to be estimated with relatively high accuracy. Whether in upright position or seated position, the human body is characterized in that the lumbar vertebra area is curved forward due to the physiological bowing. In the case of seated position, the occupant need be deep-seated so as to bring the buttocks into contact with the back side surface of the seat.

Figure 10:
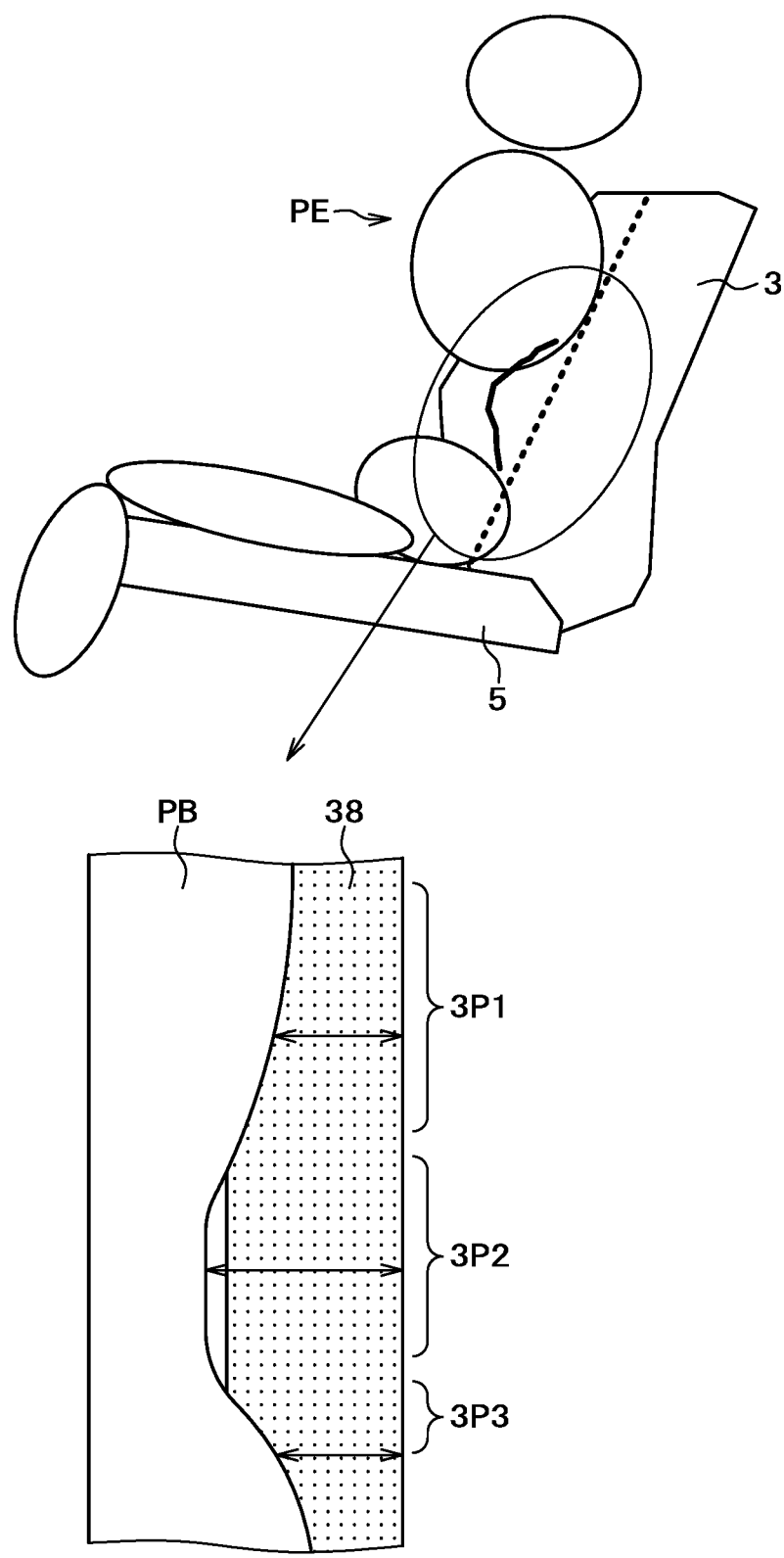
FIG. 10 is a diagram explaining a method of estimating positions of the thoracic vertebra and the lumbar vertebra of an occupant PE seated on the vehicle seat.

FIG. 10 is a diagram explaining a method of estimating the positions of the thoracic vertebra and the lumbar vertebra of an occupant PE seated on the vehicle seat 1. FIG. 10 is a conceptual diagram of the seat back 3 of the vehicle seat 1 and the occupant PE seated on the seat cushion 2. The urethane pad 38 of the seat back 3 and a back area PB of the occupant PE are shown in enlarged dimension. As to the urethane pad 38, an area of contact with the back area PB is assumed to have a constant hardness.

In the enlarged illustration of FIG. 10, "3P1" denotes a region ranging from a first lumber vertebra area to a thoracic vertebra. The region 3P1 is characterized in that in a case where the urethane pad 38 is pushed toward the back area PB at its portion corresponding to the region 3P1, the spine of the occupant PE is slightly less movable. "3P2" denotes a region ranging from a second to a fourth lumbar vertebra. The region 3P2 is characterized in that in a case where the urethane pad 382 is pushed toward the back area PB at its portion corresponding to the region 3P2, the spine of the occupant PE is more movable. "3P3" denotes a region ranging from a fifth lumbar vertebra to a pelvis vertebra. The region 3P3 is characterized in that in a case where the urethane pad 38 is pushed toward the back area PB at its portion corresponding to the region 3P3, the spine of the occupant PE is slightly less movable. The method of estimating the positions of the thoracic vertebra and the lumbar vertebra of the occupant utilizes such characteristics.

Figure 11:
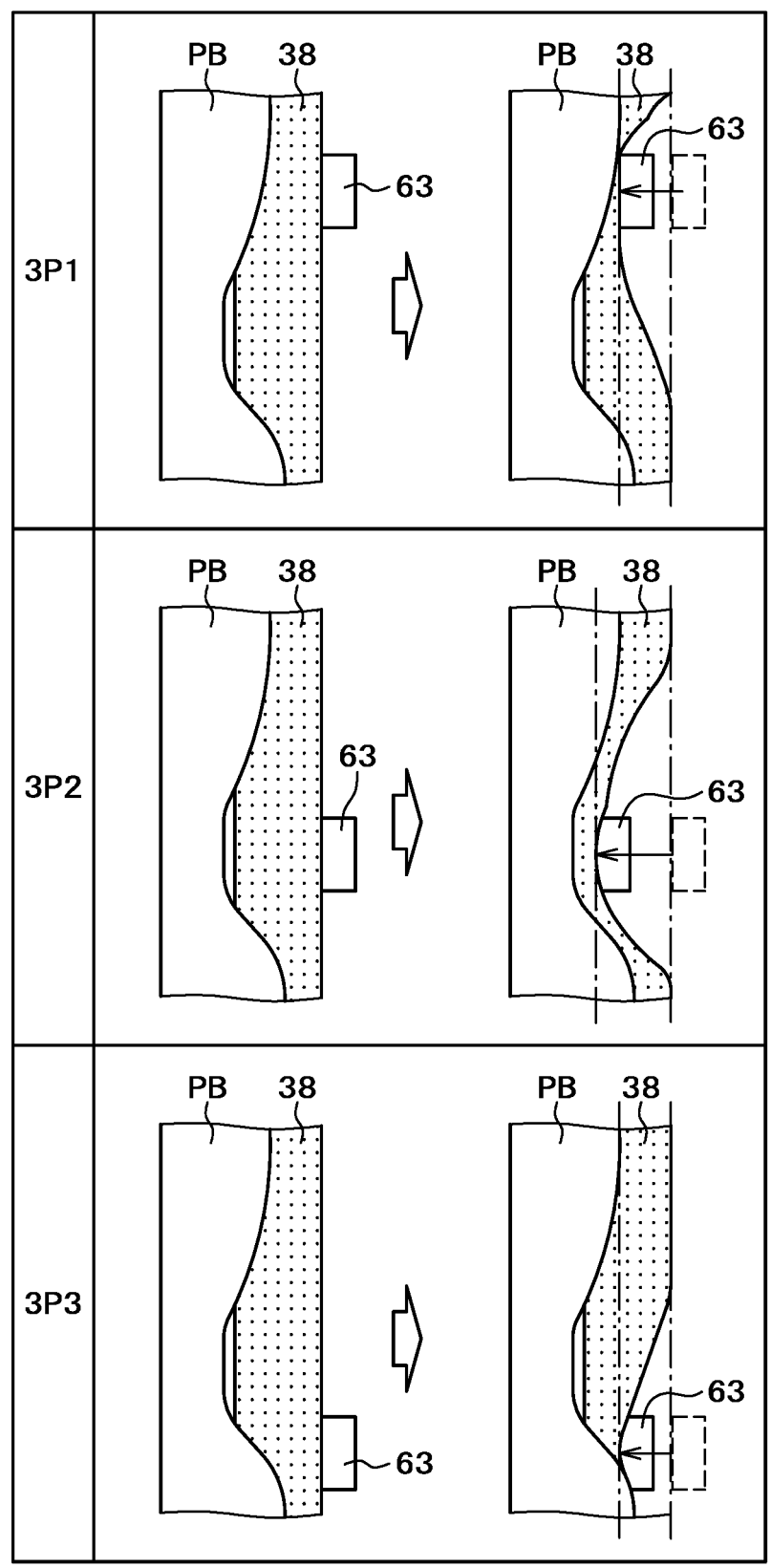
FIG. 11 is a diagram explaining a case where each of the regions 3P1 to 3P3 of the urethane pad 38 is pushed by a back side support mechanism 63.

FIG. 11 is a diagram explaining a case where each of the regions 3P1 to 3P3 of the urethane pad 38 is pushed by the back side support mechanism 63. According to FIG. 11, when the back side support mechanism 63 is pushed forward with a certain output (desired output) for a certain length of time, the pushing amount on the back side support mechanism 63 varies depending upon the regions 3P1 to 3P3 as supporting areas. The pushing amount is the largest at the region 3P2 (ranging from the second to the fourth lumbar vertebra) where the spine is more movable. The positions of the second to the fourth lumbar vertebrae of the occupant are searched for by taking the advantage of this characteristic.

When the region 3P1 is pushed forward, the spine of the occupant PE is less movable. Because of the large resistance, a three-second support pushing amount (a value of the turnover number of the pushing amount adjusting motor 701) is small.

When the region 3P2 is pushed forward, the spine of the occupant PE is more movable. Because of the small resistance, a three-second support pushing amount (a value of the turnover number of the pushing amount adjusting motor 701) is the largest.

When the region 3P3 is pushed forward, the spine of the occupant PE is slightly less movable. Because of the large resistance, a three-second support pushing amount (a value of the turnover number of the pushing amount adjusting motor 701) is small.

Figure 12:
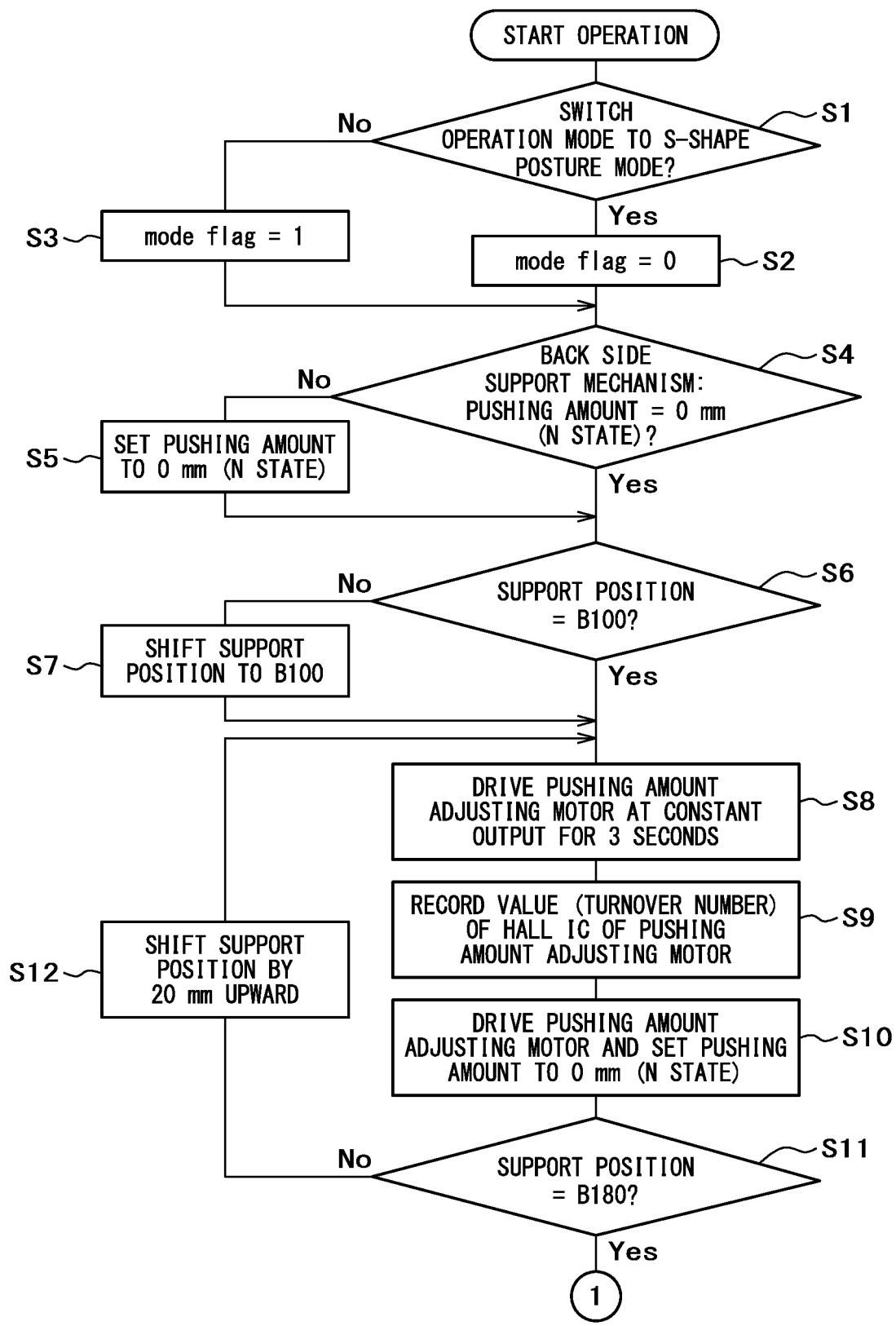
FIG. 12 is a flow chart showing the steps of an operation flow of an estimation system.
Figure 13:
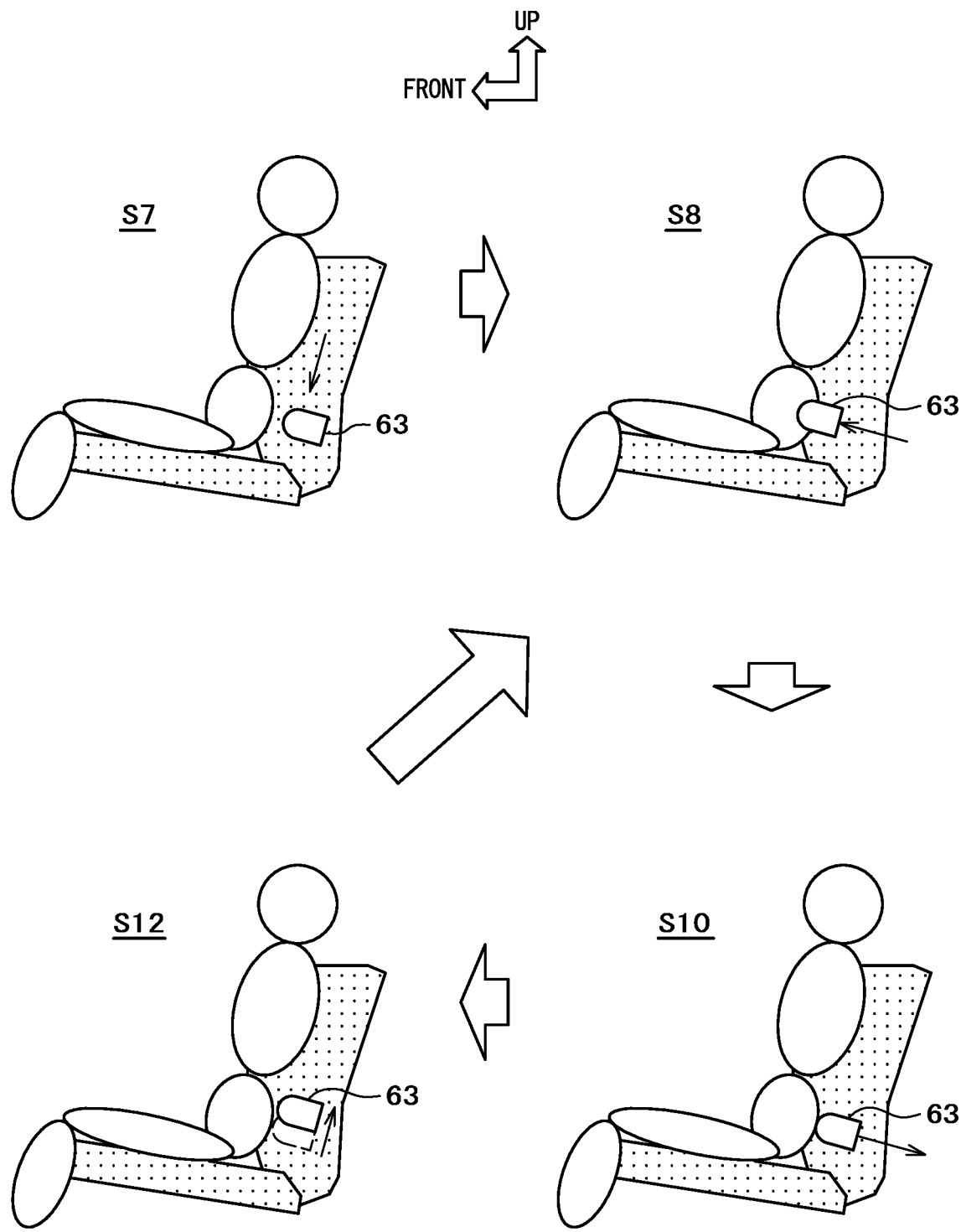
FIG. 13 is a diagram illustrating the operations of the back side support mechanism 63 during the operation flow of FIG. 12.
Figure 14:
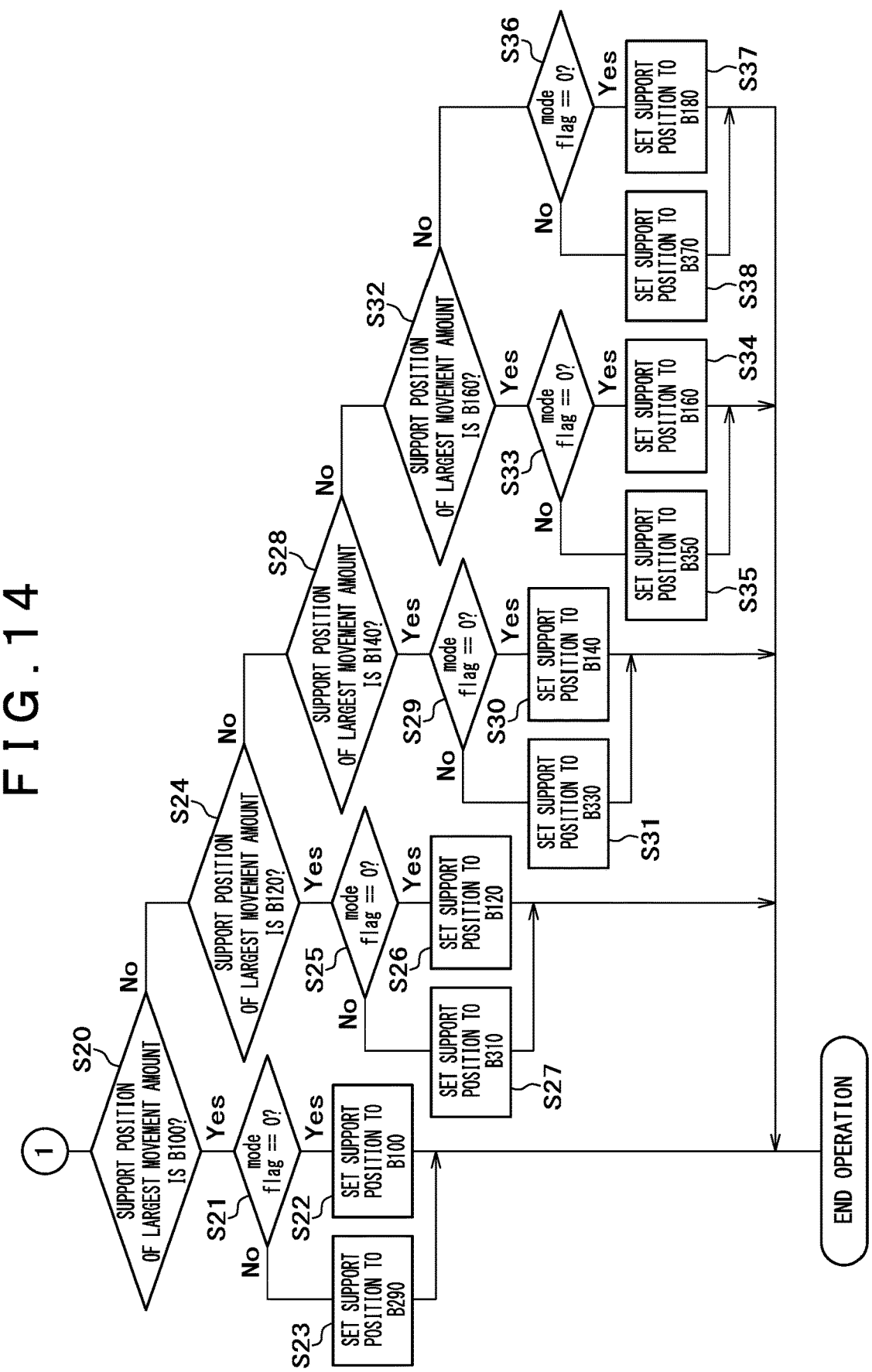
FIG. 14 is a flow chart showing the steps of an operation flow of the estimation system succeeding the operation flow of FIG. 12.

Next, the description is made on an operation flow of the estimation system which estimates the positions of the thoracic vertebra and the lumbar vertebra of the occupant. FIG. 12 is a flow chart showing the operation flow of the estimation system. FIG. 13 is a diagram illustrating the operations of the back side support mechanism 63 in the operation flow of FIG. 12. FIG. 14 is a flow chart showing the steps of an operation flow of the estimation system succeeding the operation flow of FIG. 12.

As shown in FIG. 12, when the switch 23 is turned on, the operation of the estimation system is started.

Step S1: Determine whether or not the switch 24 is in ON-state or in OFF-state. With this, whether an operation mode of the fatigue reduction system is switched to the S-shape posture mode is determined. In a case where the S-shape posture mode is selected (Yes), the operation proceeds to Step S2. In a case where the operation is switched to the C-shape posture mode (No), the operation proceeds to Step S3.

Step S2: Set a mode flag provided in the central processing unit CPU to "0" (designate the S-shape posture mode). Subsequently, the operation proceeds to Step S4.

Step S3: Set the mode flag provided in the central processing unit CPU to "1" (designate the C-shape posture mode). Subsequently, the operation proceeds to Step S4.

Step S4: Determine whether the pushing amount of the back side support mechanism 63 is 0 mm (N state) or not. In a case where the pushing amount of the back side support mechanism 63 is 0 mm (Yes), the operation proceeds to Step S6. In a case where the pushing amount of the back side support mechanism 63 is not 0 mm (No), the operation proceeds to Step S5.

Step S5: Adjust the pushing amount adjusting motor 701 so as to set the pushing amount of the back side support mechanism 63 to 0 mm. Subsequently, the operation proceeds to Step S6.

Step S6: Determine whether or not the support position of the support changing mechanism 65 is at the lowest stage (B100). Namely, whether or not the position of the back side support mechanism 63 is at the lowest stage is determined.

In a case where the support position of the support changing mechanism 65 is at the lowest stage (B100) (Yes), the operation proceeds to Step 8. In a case where the support position of the support changing mechanism 65 is not at the lowest stage (B100) (No), the operation proceeds to Step S7.

Step S7: Drive the motor 69 to shift the support position of the support changing mechanism 65 to the lowest stage (B100). Thus, the position of the back side support mechanism 63 is set to the lowest stage. This state is illustrated by a fragmentary diagram S7 in FIG. 13. Subsequently, the operation proceeds to Step S8.

Step S8: Drive the pushing amount adjusting motor 701 at a constant output for a certain length of time (3 to 5 seconds). Thus, an operation of pressing the back side support mechanism 63 against the region 3P3 is performed as illustrated by a fragmentary diagram S8 in FIG. 13. In this operation, the pushing amount adjusting motor 701 is driven till resistance on the back side support mechanism 63 pressing on the urethane pad 38 reaches a predetermined threshold value. Subsequently, the operation proceeds to Step S9.

Step S9: When the back side support mechanism 63 pushes forward till the resistance thereon reaches the predetermined threshold value, the value (turnover number) of the pushing amount adjusting motor 701, as detected by the Hall IC 81, is recorded by the central processing unit CPU. Subsequently, the operation proceeds to step S10.

Step S10: Drive the pushing amount adjusting motor 701 and set the pushing amount of the back side support mechanism 63 to 0 mm (N state). This state is illustrated by a fragmentary diagram S10 in FIG. 13. Subsequently, the operation proceeds to step S11.

Step S11: Determine whether or not the support position of the support changing mechanism 65 is at the highest stage (B180). Namely, whether or not the back side support mechanism 63 is at the highest stage is determined. In a case where the support position of the support changing mechanism 65 is at the highest stage (B180) (Yes), the operation proceeds to Step S20 in FIG. 14. In a case where the support position of the support changing mechanism 65 is not at the highest stage (B180) (No), the operation proceeds to Step S12.

Step S12: Drive the motor 69 to shift the support position of the support changing mechanism 65 to place 20 mm upward therefrom, for example. This state is illustrated by a fragmentary diagram S12 in FIG. 13. An upward shift distance or a downward shift distance can be set to any value in the range of 10 mm to 25 mm, for example.

After Step S12, the operations of Steps S8 to S12 are repeated till the support position of the support changing mechanism 65 is shifted to the highest stage (B180).

Next, an operation flow of FIG. 14 is described. In this operation flow, the position of the thoracic vertebra or lumbar vertebra of each occupant is estimated from the turnover number values of the pushing amount adjusting motor 701 as detected by the Hall IC 81 at individual support positions and recorded in Step S9. According to the operation flow of FIG. 14, the turnover number values of the pushing amount adjusting motor 701 as recorded at the individual support positions are compared by the central processing unit CPU. In a case where the C-shape posture is applied by withdrawing the support on the S-shape posture or on the lumbar vertebra area, the support position of the back side support mechanism 63 is set to a position where the pushing amount adjusting motor 701 exhibits the largest turnover number. In a case where the C-shape posture is applied by pressing on the back area, the support position of the back side support mechanism 63 is set to a position derived from calculation using the following equation 1. The calculation is performed by the central processing unit CPU.

$$\text{Support position of the back side support mechanism 63 in the } C\text{-shape posture mode} = 190 + (X - 100) \quad \text{(Equation 1)},$$

where "X" denotes a position out of the positions B100 to B180, at which the motor exhibits the largest turnover number. It is noted that B100 to B180 are values representing the support positions of the support changing mechanism 65. The lowest stage of the support position of the support changing mechanism 65 is expressed as B100 (reference position). In a case where the support position of the support changing mechanism 65 is shifted L mm upward from the lowest stage, the shifted support position is expressed as B(100+L). In the case of estimating the position of the lumbar vertebra, B100 and B180 represent the lowest stage of the support position and the highest stage of the support position of the support changing mechanism 65, respectively.

Each of the steps of the operation flow in FIG. 14 is described as follows.

Step S20: Determine whether or not a support position at which the pushing amount adjusting motor 701 exhibits the largest turnover number value as detected by the Hall IC 81, namely the back side support mechanism 63 exhibits the largest pushing amount (movement amount) is the lowest stage. In a case where the support position of the largest pushing amount (movement amount) is at the lowest stage B100 (Yes), the operation proceeds to Step S21. In a case where the support position of the largest pushing amount (movement amount) is not at the lowest stage B100 (No), the operation proceeds to Step 24.

Step S21: Determine whether the mode flag is "0" or not (Determine whether the operation is in the S-shape posture mode or not). In the case of "Yes" (S-shape posture mode), the operation proceeds to Step S22. In the case of "No" (C-shape posture mode), the operation proceeds to Step S23.

Step S22: Set the support position of the back side support mechanism 63 to the lowest stage (B100) and terminate the operation.

Step S23: Set the support position of the back side support mechanism 63 to B290 and terminate the operation.

Step S24: Determine whether or not the support position of the largest turnover number value of the pushing amount adjusting motor 701 as detected by the Hall IC 81, namely the support position of the largest pushing amount (movement amount) of the back side support mechanism 63 is B120. In a case where the support position of the largest pushing amount (movement amount) is B120 (Yes), the operation proceeds to Step S25. In a case where the support position of the largest pushing amount (movement amount) is not B120 (No), the operation proceeds to Step S27.

Step S25: Determine whether the mode flag is "0" or not (Determine whether the operation is in the S-shape posture mode or not). In the case of "Yes" (S-shape posture mode), the operation proceeds to Step S26. In the case of "No" (C-shape posture mode), the operation proceeds to Step S27.

Step S26: Set the support position of the back side support mechanism 63 to B120 and terminate the operation.

Step S27: Set the support position of the back side support mechanism 63 to B310 and terminate the operation.

Step S28: Determine whether or not the support position of the largest turnover number value of the pushing amount adjusting motor 701 as detected by the Hall IC 81, namely the support position of the largest pushing amount (movement amount) of the back side support mechanism 63 is B140. In a case where the support position of the largest pushing amount (movement amount) is B140 (Yes), the operation proceeds to Step S29. In a case where the support position of the largest pushing amount (movement amount) is not B140 (No), the operation proceeds to Step S32.

Step S29: Determine whether the mode flag is "0" or not (Determine whether the operation is in the S-shape posture mode or not). In the case of "Yes" (S-shape posture mode), the operation proceeds to Step S30. In the case of "No" (C-shape posture mode), the operation proceeds to Step S31.

Step S30: Set the support position of the back side support mechanism 63 to B140 and terminate the operation.

Step S31: Set the support position of the back side support mechanism 63 to B330 and terminate the operation.

Step S32: Determine whether or not the support position of the largest turnover number value of the pushing amount adjusting motor 701 as detected by the Hall IC 81, namely the support position of the largest pushing amount (movement amount) of the back side support mechanism 63 is B160. In a case where the support position of the largest pushing amount (movement amount) is B160 (Yes), the operation proceeds to Step S33. In a case where the support position of the largest pushing amount (movement amount) is not B160 (No), the operation proceeds to Step S36.

Step S33: Determine whether the mode flag is "0" or not (Determine whether the operation is in the S-shape posture mode or not). In the case of "Yes" (S-shape posture mode), the operation proceeds to Step S34. In the case of "No" (C-shape posture mode), the operation proceeds to Step S35.

Step S34: Set the support position of the back side support mechanism 63 to B160 and terminate the operation.

Step S35: Set the support position of the back side support mechanism 63 to B350 and terminate the operation.

Step S36: Determine whether the mode flag is "0" or not (Determine whether the operation is in the S-shape posture mode or not). In the case of "Yes" (S-shape posture mode), the operation proceeds to Step S37. In the case of "No" (C-shape posture mode), the operation proceeds to Step S35.

Step S37: Set the support position of the back side support mechanism 63 to B180 and terminate the operation.

Step S38: Set the support position of the back side support mechanism 63 to B370 and terminate the operation.

By way of modification, the position of the thoracic vertebra or the lumbar vertebra can also be estimated by using a method where time taken by the motor to reach a predetermined turnover number is recorded on a per-support position basis and these time data pieces are compared by the central processing unit CPU.

Fatigue Reduction System

The fatigue reduction system can be switched to any of three modes by operating mode selector switches 23, 24. The modes include: an OFF-state of the fatigue reduction system (normal lumbar support mode); a first fatigue reduction mode (switching from the N-state to the S-shape posture); and a second fatigue reduction mode (switching from the N-state to the C-shape posture). The number of selectable modes is not limited to three. The system can be switched to any one of four or more modes (e.g., switched to a massage system or the like) or can be switched only between two modes (ON/OFF switching between two modes).

The following operations are performed when the switch 23 is switched from the OFF state to the ON state.

1. Switch the back side support mechanism 63 to the N state.

2. Determine an optimum support position.

3. Operate the posture changing mechanism at regular intervals (1 minute or more and less than 30 minutes) so as to change the seated posture of the occupant. The posture pattern and the operation interval vary depending upon the selected mode.

The fatigue reduction system is switched to the OFF state by the following operation and automatically returns to the N state.

1. When the switch 23 is operatively switched from the ON state to the OFF state.

2. When the central processing unit CPU receives from the vehicle ECU 92 a stop signal for the fatigue reduction system.

When the fatigue reduction system is in the ON state, the support strength of the posture changing mechanism 110 can be adjusted by the occupant at will (support strength in standard setting: maximum). When the fatigue reduction system is in the ON state, manual adjustment of the support strength of the posture changing mechanism 110 is allowed only when the posture changing mechanism 110 is in operation (S-shape posture, C-shape posture). When the fatigue reduction system is in the OFF state, the support position and the support strength of the posture changing mechanism can be adjusted according to the preference of the occupant operating the switch 21, 22 just as in the normal lumbar support mode.

A posture switching operation pattern can be configured in a manner to satisfy the following conditions.

1. The duration of one posture is a predetermined length of time between 5 minute or more and less than 30 minutes.

2. The same posture is not set consecutively. For example, it is impossible to make settings which include 15-minute S-shape posture, followed by 5-minute S-shape posture.

Figure 15:
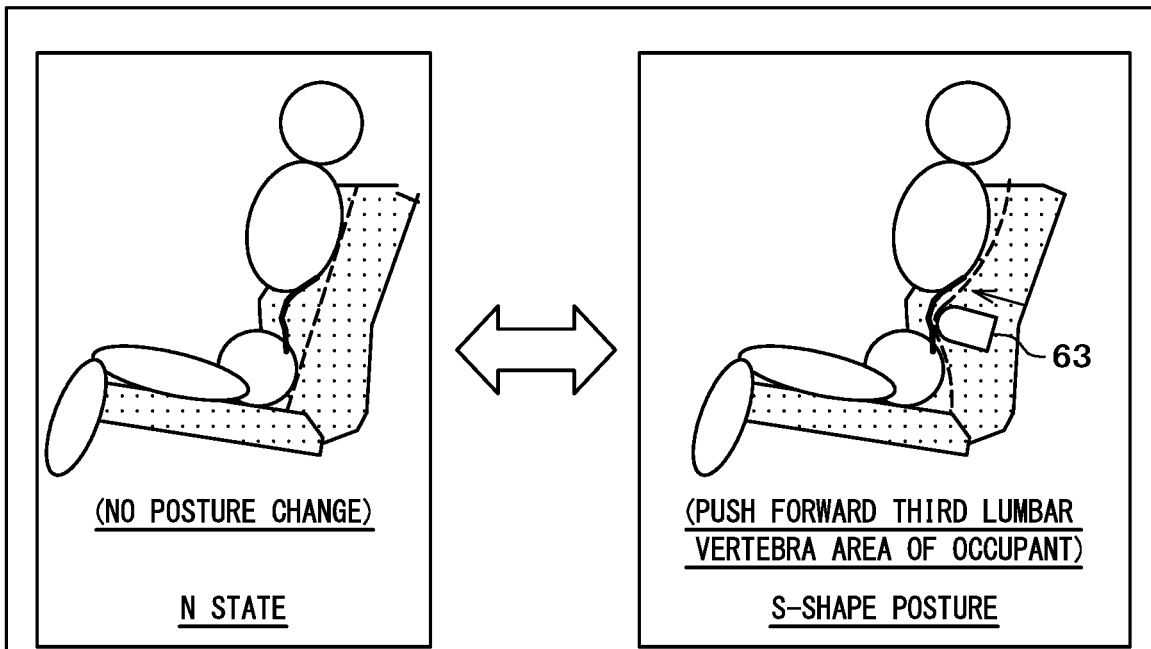
FIG. 15 is a diagram illustrating a first fatigue reduction mode.
Figure 15:
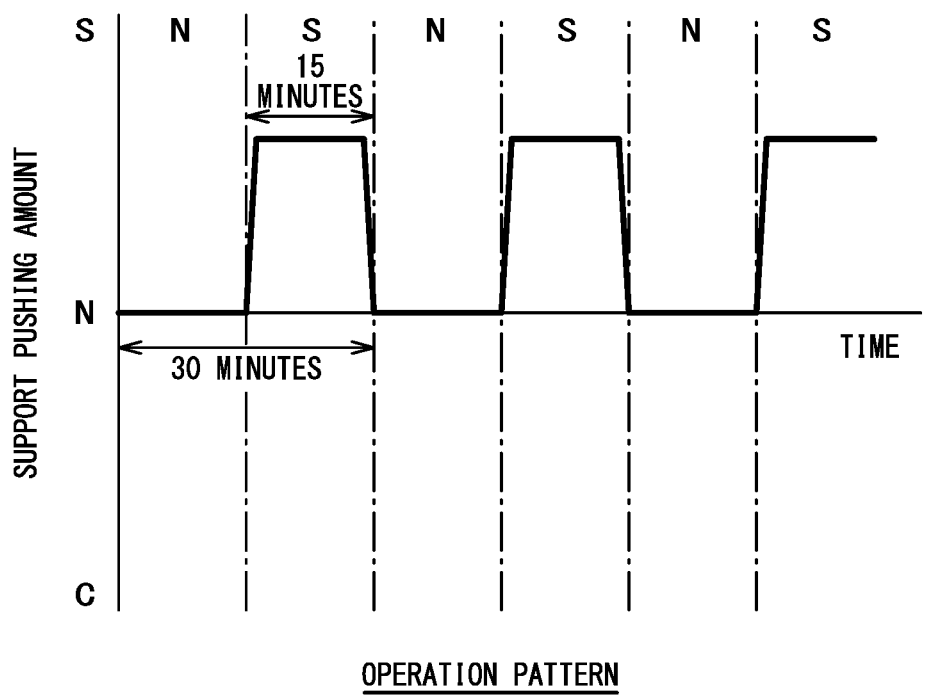
Figure 16:
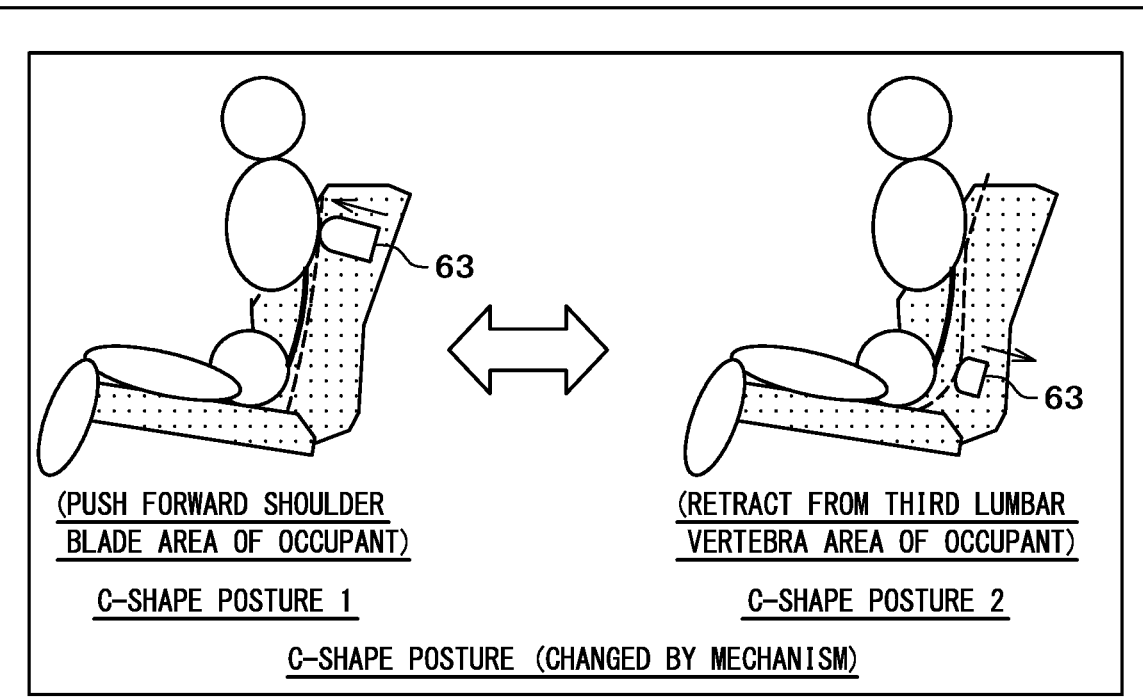
FIG. 16 is a diagram illustrating a second fatigue reduction mode.
Figure 16:
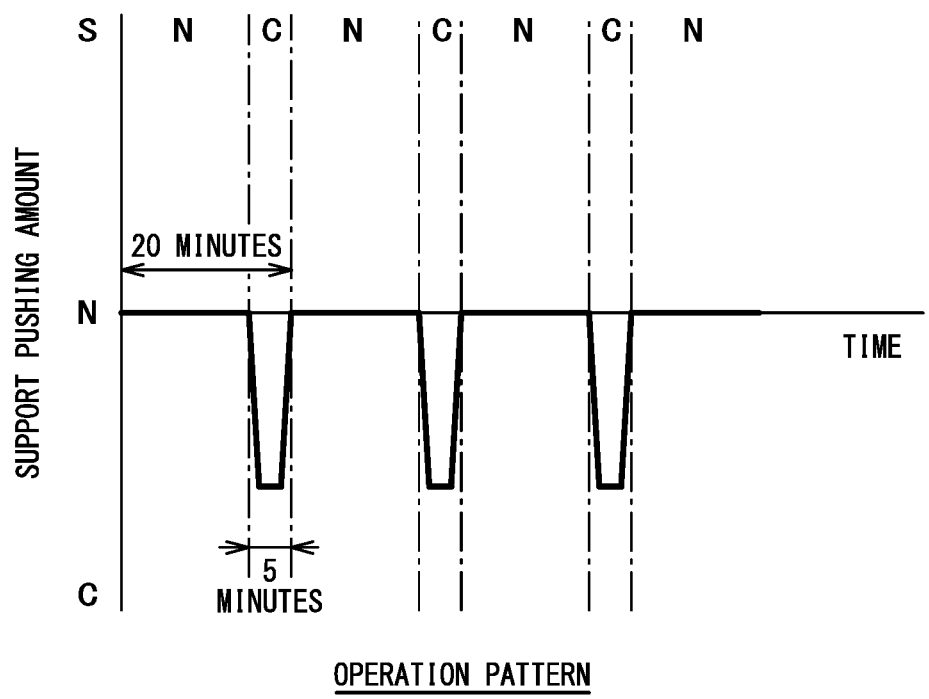

FIG. 15 is a diagram illustrating the first fatigue reduction mode. FIG. 16 is a diagram illustrating the second fatigue reduction mode. In operation pattern graphs shown in FIG. 15 and FIG. 16, the abscissa is the time and the ordinate is the support pushing amount. The graphs show the pushing amount (S) from the N state and the retracting amount (C) from the N state, respectively.

As shown in FIG. 15, the operation is switched between the N state and the S-shape posture (S) in the first fatigue reduction mode. According to the example, the posture switching operation pattern is configured as N state (N)→S-shape posture (S)→N state (N)→S-shape posture (S)→N state (N)→S-shape posture (S). In this example, one cycle (N state (N)→S-shape posture (S)) takes 30 minutes, of which 15 minutes is allotted to the N state and the remaining 15 minutes is allotted to the S-shape posture.

As shown in FIG. 16, the operation is switched between the N state and the C-shape posture (C) in the second fatigue reduction mode. The C-shape posture is varied by the mechanism and includes, for example, a C-shape posture C1 where a blade bone area of the occupant is pushed forward; and a C-shape posture C2 where a third lumbar vertebra area of the occupant is retracted. Hereinafter, the description is made by referring to the C-shape posture C1 and the C-shape posture C2 as "C-shape posture". In the second fatigue reduction mode, the operation is switched between the N state and the C-shape posture. According to the example, the posture switching operation pattern is configured as N state (N)→C-shape posture (C)→N state (N)→C-shape posture (C)→N state (N)→C-shape posture (C). In this example, one cycle (N state (N)→C-shape posture (C)) takes 20 minutes, of which 15 minutes is allotted to the N state and 5 minutes is allotted to the C-shape posture.

Figure 17:
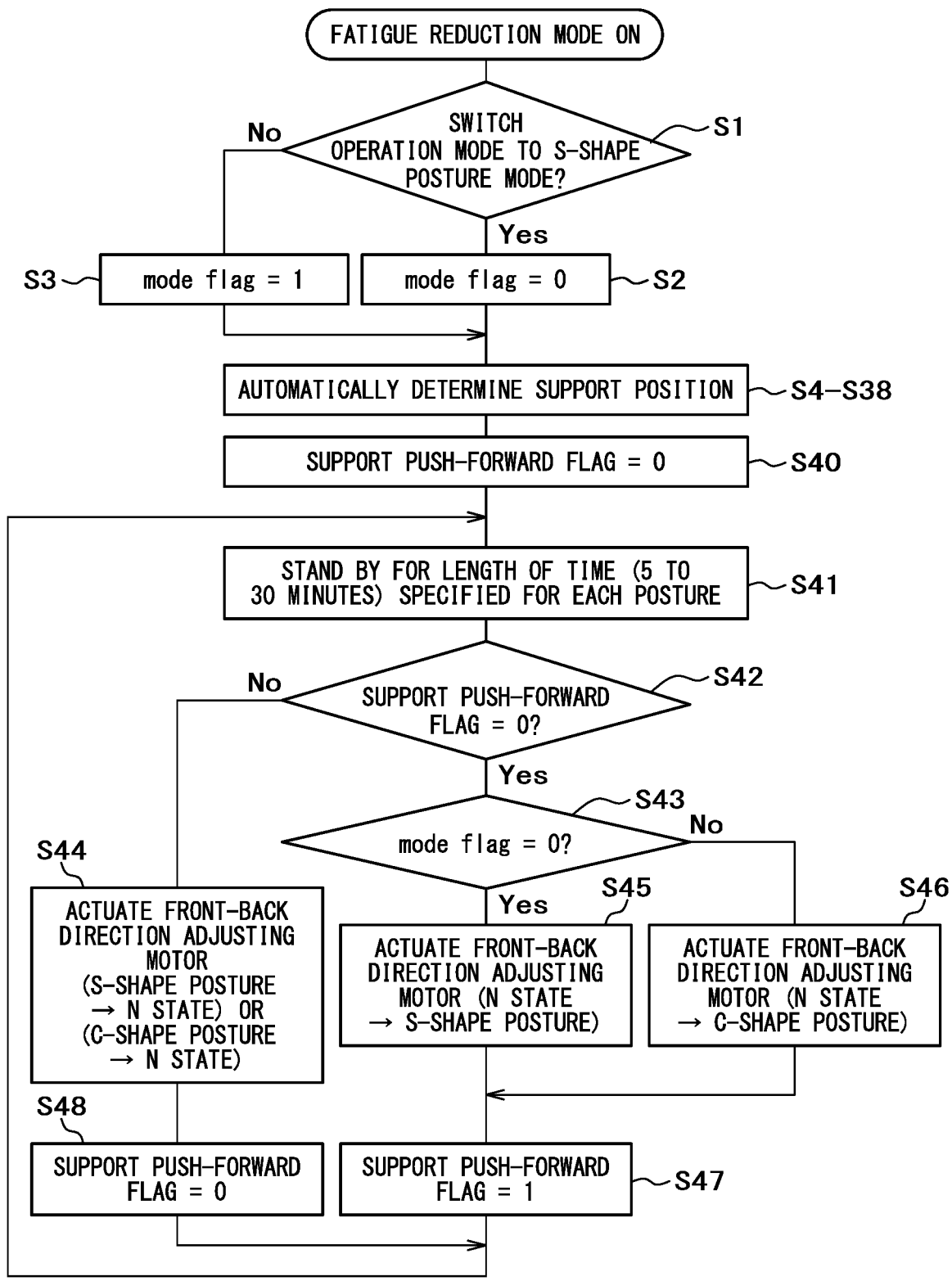
FIG. 17 is a flow chart showing the steps of an operation flow of a fatigue reduction system.

Next, the description is made on an operation flow of the fatigue reduction system with reference to FIG. 17. FIG. 17 is a flow chart showing the steps of an operation flow of the fatigue reduction system. When the fatigue reduction system is turned ON, Steps S1 to S38 described with reference to FIG. 12 and FIG. 14 are performed. Step S38 is followed by Step S40.

Step S40: Set a support push-forward flag provided in the central processing unit CPU to "0". The "0" of the support push-forward flag is defined to designate the N state. Subsequently, the operation proceeds to Step S41.

Step S41: Stand by for length of time (5 to 30 minutes) specified for each posture. Subsequently, the operation proceeds to Step S42.

Step S42: Determine whether the support push-forward flag is "0" or not. In a case where the support push-forward flag is "0" (Yes), the operation proceeds to Step S43. In a case where the support push-forward flag is not "0" (No), the operation proceeds to Step S44.

Step S43: Determine whether the mode flag is "0" or not. In a case where the mode flag is "0" (Yes), the operation proceeds to Step S45. In a case where the mode flag is not "0" (No), the operation proceeds to Step S46.

Step S44: Actuate the pushing amount adjusting motor 701 as a front-back direction adjusting motor so as to switch the operation mode from the S-shape posture to the N state or from the C-shape posture to the N state. Subsequently, the operation proceeds to step S48.

Step S45: Actuate the pushing amount adjusting motor 701 as the front-back direction adjusting motor so as to switch the operation mode from the N state to the S-shape posture. Subsequently, the operation proceeds to step S47.

Step S46: Actuate the pushing amount adjusting motor 701 as the front-back direction adjusting motor so as to switch the operation mode from the N state to the C-shape posture. Subsequently, the operation proceeds to step S47.

Step S47: Set the support push-forward flag to "1". The operation proceeds to Step S41.

Step S48: Set the support push-forward flag to "0". Subsequently, the operation proceeds to step S41.

Modification

Figure 18:
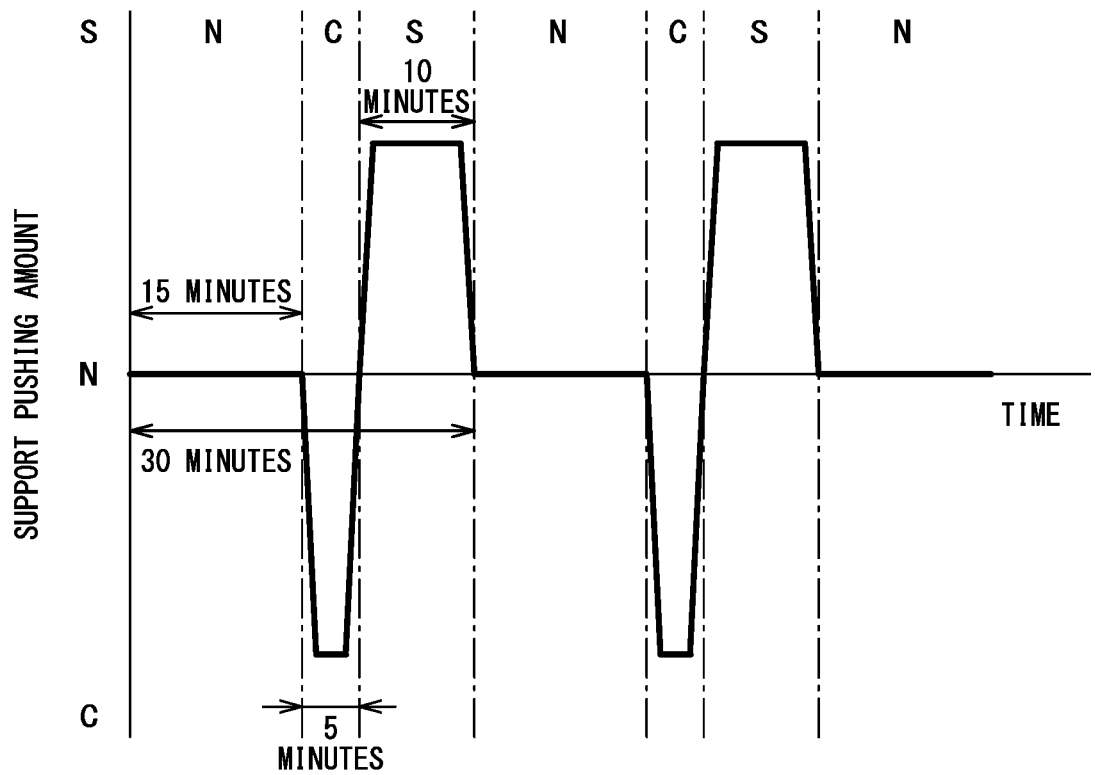
FIG. 18 is a diagram illustrating an operation pattern of a fatigue reduction system according to a modification. lumbar vertebra of an occupant PE seated on the vehicle

FIG. 18 is a diagram illustrating an operation pattern of the fatigue reduction system according to a modification. Referring to FIG. 15 to FIG. 17, the description has been made on the two patterns of switching the mode from the N state to the S-shape posture and from the N state to the C-shape posture. However, the present invention is not limited to these. As shown in FIG. 18, the fatigue reduction system is also adapted for a mode combining three postures (N state, S-shape posture, C-shape posture). A switching duty ratio can be set based on the same conditions for switching two postures. The posture switching operation pattern of FIG. 18 is configured as N state (N)→C-shape posture (C)→S-shape posture (S)→N state (N)→C-shape posture (C)→S-shape posture (S)→N state (N). One cycle of this operation (N state (N)→C-shape posture (C)→S-shape posture (S)) of this example takes 30 minutes, of which 15 minutes is allotted to the N state, 5 minutes is allotted to the C-shape posture, and 10 minutes is allotted to the S-shape posture.

The order of the N state, the S-shape posture and the C-shape posture can be set arbitrarily under the following conditions. The fatigue reduction mode is always started with the N state (with the support push-forward flag "0"). The same posture is not set consecutively. For example, it is impossible to set a pattern including 10-minute S-shape posture followed by 10-minute S-shape posture.

The embodiments can offer the following effects.

1) Without preparing the sensor in addition to the posture changing mechanism, the positions of the lumbar vertebra and the thoracic vertebra of each occupant can be estimated only by controlling the operation of the posture changing mechanism.

2) The fatigue of the occupant can be reduced at low cost and by means of a small number of parts and simple control.

While the present invention made by the inventors has been specifically described by way of examples, it goes without saying that the present invention is not limited to the above-described embodiments and examples but may include a variety of changes and modifications.

What is claimed is:

1. A seat for vehicle comprising:
a seat cushion; and
a seat back connected to the seat cushion,
wherein the seat back includes a posture changing mechanism,
the posture changing mechanism including:
a back side support mechanism;
a first motor capable of shifting a position of the back side support mechanism with respect to a vertical direction; and
a second motor capable of shifting the position of the back side support mechanism with respect to a front-back direction,
the seat further including a control unit configured to estimate a position of a lumbar vertebra area of an occupant of the seat by: while changing the vertical position of the back side support mechanism by means of the first motor, changing a forward position of the back side support mechanism at each of a plurality of vertical positions thereof by means of the second motor, so as to obtain a turnover number value of the second motor achieving a desired resistance at each of the plurality of vertical positions, and comparing the turnover number values of the second motor achieving the desired resistance.

2. The seat for vehicle according to claim 1, wherein the vertical position of the back side support mechanism at which the second motor exhibits the largest turnover number value is estimated to be the lumbar vertebra area of the seat occupant.

3. The seat for vehicle according to claim 2, wherein the control unit is configured to estimate a position of a thoracic vertebra area of the seat occupant by performing a calculation based on the vertical position of the back side support mechanism at which the second motor exhibits the largest turnover number value.

4. The seat for vehicle according to claim 3, wherein the control unit is configured to perform operations of a fatigue reduction system having:
a first fatigue reduction mode to set the back side support mechanism to the position estimated to be the position of the lumbar vertebra area; and
a second fatigue reduction mode to set the back side support mechanism to the position estimated to be the position of the thoracic vertebra area, and
wherein, in the first fatigue reduction mode and the second fatigue reduction mode, the control unit controls the second motor to change the position of the back side support mechanism with respect to the front-back direction at predetermined time intervals.

5. The seat for vehicle according to claim 1, further comprising:
a first Hall IC for detecting a turnover number value of the first motor; and
a second Hall IC for detecting a turnover number value of the second motor,
the control unit including a central processing unit connected to the first Hall IC and the second Hall IC, and
wherein the central processing unit estimates the position of the lumbar vertebra area of the seat occupant by comparing the turnover number values of the second motor achoeving the desired resistance at each of the plurality of vertical positions of the back side support mechanism.

6. The seat for vehicle according to claim 5, the control unit further comprising a motor driver connected to the first motor and the second motor, and
wherein the motor driver controls rotations of the first motor and the second motor based on control from the central processing unit.

* * * * *